US010691342B2

United States Patent
Chen et al.

(10) Patent No.: US 10,691,342 B2
(45) Date of Patent: Jun. 23, 2020

(54) DATA STORAGE DEVICE, NON-VOLATILE MEMORY OPERATING METHOD, AND METHOD FOR EXECUTING OPERATIONAL COMMANDS TO OPERATE A DATA STORAGE MEDIUM

(71) Applicant: Silicon Motion, Inc., Jhubei, Hsinchu County (TW)

(72) Inventors: Shu-Lei Chen, New Taipei (TW); Ming-Hung Chang, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 212 days.

(21) Appl. No.: 15/938,413

(22) Filed: Mar. 28, 2018

(65) Prior Publication Data
US 2019/0004702 A1 Jan. 3, 2019

(30) Foreign Application Priority Data
Jun. 30, 2017 (TW) .................................. 106121978

(51) Int. Cl.
*G06F 3/06* (2006.01)
(52) U.S. Cl.
CPC ............ *G06F 3/061* (2013.01); *G06F 3/0659* (2013.01); *G06F 3/0688* (2013.01)
(58) Field of Classification Search
None
See application file for complete search history.

(56) References Cited

U.S. PATENT DOCUMENTS

| 7,062,592 | B2* | 6/2006 | Varma | H04L 47/24 370/235 |
| 7,464,180 | B1* | 12/2008 | Jacobs | H04L 47/2441 370/395.42 |
| 7,701,949 | B1* | 4/2010 | Rose | H04L 47/245 370/229 |
| 8,543,758 | B2 | 9/2013 | Larson et al. | |
| 2012/0203986 | A1* | 8/2012 | Strasser | G06F 3/0611 711/158 |

(Continued)

OTHER PUBLICATIONS

F. Chen, R. Lee and X. Zhang, "Essential roles of exploiting internal parallelism of flash memory based solid state drives in high-speed data processing," 2011 IEEE 17th International Symposium on High Performance Computer Architecture, San Antonio, TX, 2011, pp. 266-277. (Year: 2011).*

(Continued)

*Primary Examiner* — Edward J Dudek, Jr.
*Assistant Examiner* — Ralph A Verderamo, III
(74) *Attorney, Agent, or Firm* — McClure, Qualey & Rodack, LLP

(57) ABSTRACT

An optimized non-volatile memory operating method. A data storage device has a plurality of non-volatile memory spaces and a plurality of command queues. The command queues are provided to correspond to the non-volatile storage memory one on one. The same channel is shared to operate the non-volatile memory spaces. To deal with the one channel communication technology, the data storage device adopts task switching mechanisms to switch between the different command queues for execution of the operational commands queued in the different command queues.

22 Claims, 8 Drawing Sheets

(56) References Cited

U.S. PATENT DOCUMENTS

| | | | |
|---|---|---|---|
| 2012/0278664 A1* | 11/2012 | Kazui | G06F 12/0246 714/48 |
| 2014/0281083 A1* | 9/2014 | Canepa | G06F 13/364 710/112 |
| 2017/0048145 A1* | 2/2017 | Shiraki | H04L 47/6215 |
| 2018/0232157 A1* | 8/2018 | Seo | G06F 3/0611 |

OTHER PUBLICATIONS

Cagdas Dirik and Bruce Jacob. 2009. The performance of PC solid-state disks (SSDs) as a function of bandwidth, concurrency, device architecture, and system organization. In Proceedings of the 36th annual international symposium on Computer architecture;(ISCA '09). ACM, New York, NY, USA, 279-289. (Year:.*

* cited by examiner

FIG. 3

DATA STORAGE DEVICE, NON-VOLATILE MEMORY OPERATING METHOD, AND METHOD FOR EXECUTING OPERATIONAL COMMANDS TO OPERATE A DATA STORAGE MEDIUM

CROSS REFERENCE TO RELATED APPLICATIONS

This Application claims priority of Taiwan Patent Application No. 106121978, filed on Jun. 30, 2017, the entirety of which is incorporated by reference herein.

BACKGROUND OF THE INVENTION

Field of the Invention

The present invention relates to optimization of a non-volatile memory operating method.

Description of the Related Art

There are various forms of non-volatile memory (NVM) used in data storage devices for long-term data retention, such as a flash memory, magnetoresistive RAM, ferroelectric RAM, resistive RAM, spin transfer torque-RAM (STT-RAM), and so on.

A non-volatile memory can be accessed through multiple channels. One channel may be shared by more than one non-volatile memory space of a non-volatile memory. The different non-volatile memory spaces that correspond to the same channel may be accessed through the channel in an interleaved way according to chip enable signals. How to optimize the interleaving access of the different non-volatile memory spaces which share the same channel is an important issue in this technical field.

BRIEF SUMMARY OF THE INVENTION

A data storage device in accordance with an exemplary embodiment of the disclosure has a plurality of non-volatile memory spaces and a plurality of command queues. The command queues are provided to correspond to the non-volatile memory spaces one on one. The non-volatile memory spaces are operated through the same channel.

In an exemplary embodiment, the data storage device further includes a controller, determining whether to change the working command queue or not at the end of each round of status polling. At the end of one round of status polling, the controller may check whether any command queue besides the working command queue contains a high-priority command having higher priority than normal-priority commands, to change the working command queue, for execution of the high-priority command.

In an exemplary embodiment, the data storage device further includes a controller, attaching a task switching command to the end of each high-priority command for each non-volatile memory space, each high-priority command having higher priority than normal-priority commands. when executing the task switching command, the controller checks whether any command queue besides the working command queue contains a high-priority command, to change the working command queue, for execution of the high-priority command. When no high-priority command is obtained in the execution of the task switching command, the controller checks whether any command queue besides the working command queue contains a status polling command or a data transmission command, to change the working command queue, for execution of the status polling command or a data transmission command.

In an exemplary embodiment, the data storage device further includes a controller, dividing the data transmission command to insert task switching commands between the divided data transmission command. When executing the task switching command, the controller checks whether any command queue besides the working command queue contains a high-priority command having higher priority than normal-priority commands, to change the working command queue, for execution of the high-priority command.

In another exemplary embodiment, a non-volatile memory operating method is disclosed, comprising: operating a plurality of non-volatile memory spaces through the same channel; and providing a plurality of command queues corresponding to the plurality of non-volatile memory spaces one on one.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3 is a timing diagram depicting four command queues CQ #1, CQ #2, CQ #3, and CQ #4 with operational commands queued therein;

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory may be a memory device for long-term data retention such as a flash memory, a magnetoresistive RAM, a ferroelectric RAM, a resistive RAM, a spin transfer torque-RAM (STT-RAM) and so on. The following discussion is regarding flash memory in particular as an example, but it is not intended to limit the application to the field of flash memory.

The flash memory is often used as a data storage medium in today's data storage devices, for implementations of a memory card, a USB flash device, an SSD and so on. In another exemplary embodiment, the flash memory is packaged with a controller to form a multiple-chip package and named eMMC.

A data storage device using a flash memory as a data storage medium can be applied to a variety of electronic devices/systems, including a smartphone, a wearable device, a tablet computer, a virtual reality device, a data center, etc. A main computing unit of an electronic system may be regarded as a host operating a data storage device equipped to the electronic system.

A data storage medium using a flash memory may be accessed through multiple channels. Each channel is provided to access multiple logical units (with different logical unit numbers, i.e. different LUNs). One channel is shared by several LUNs, e.g. in an interleaved way, by properly asserting chip enable signals corresponding to the different LUNs. In a conventional technique, the operational commands for the different LUNs sharing the same channel are queued in a single command queue waiting to be processed one by one. In the disclosure, different command queues are provided for the different LUNs sharing the same channel. The operational commands for the different LUNs are separately queued in the different command queues. The operational commands queued in the different command queues can be executed alternately in an optimized interleaved way and are less delayed by each other. Therefore, the execution of the operational commands is effectively accelerated and the system performance of the data storage device is effectively improved. In addition, in order to run the operational commands queued in the different queues alternately, a task switching mechanism is introduced in the disclosure to switch between the command queues.

Figure 1:
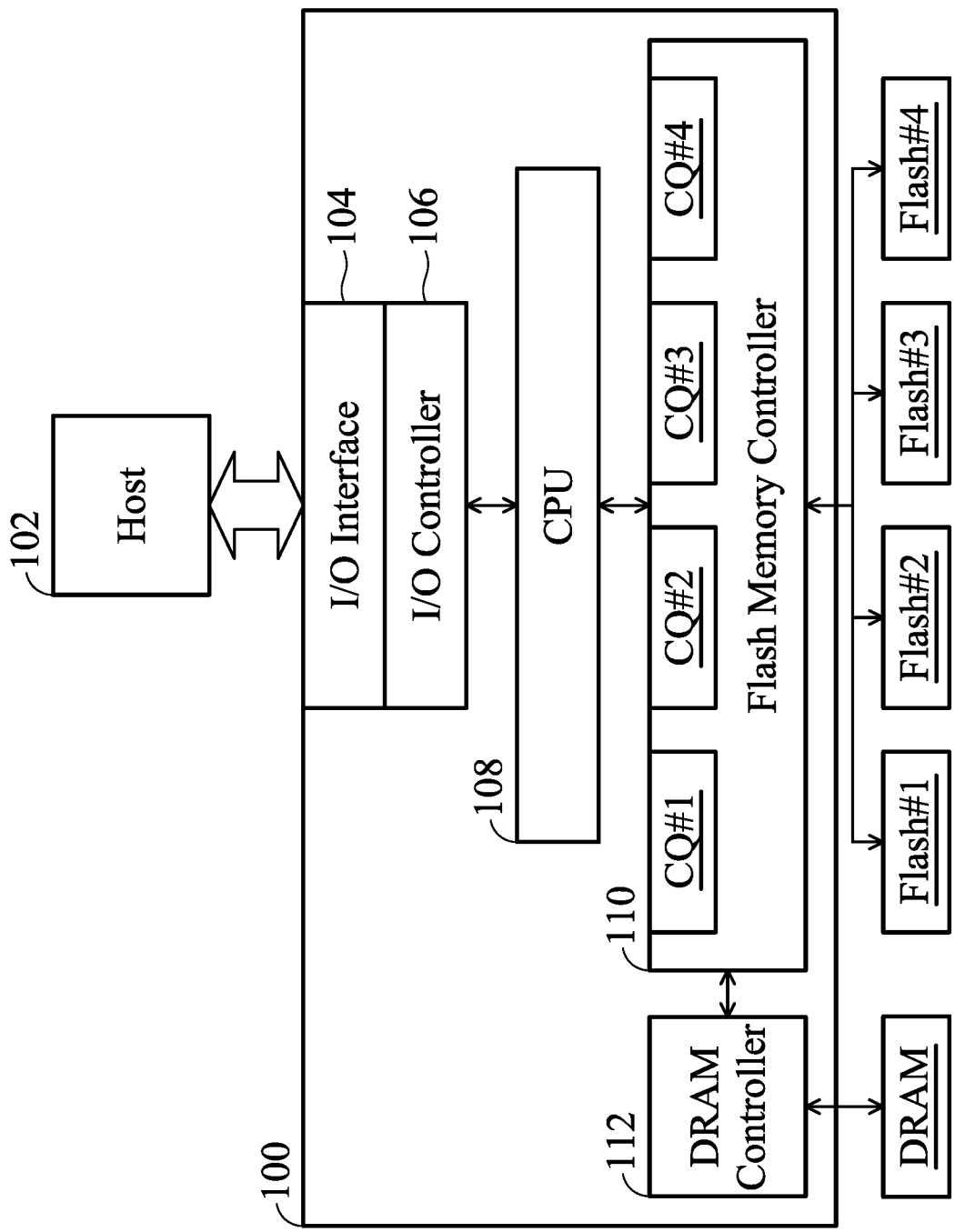
FIG. 1 depicts a data storage device in accordance with an exemplary embodiment of the disclosure.

FIG. 1 is a block diagram depicting a data storage device in accordance with an exemplary embodiment of the disclosure. The data storage device uses a flash memory as a data storage medium. For convenience of illustration, only one channel is illustrated in FIG. 1. Through the channel shown in FIG. 1, multiple flash memory spaces Flash #1, Flash #2, Flash #3 and Flash #4 are accessed in an interleaved way according to chip enable signals of the flash memory spaces Flash #1, Flash #2, Flash #3 and Flash #4. The different flash memory spaces Flash #1, Flash #2, Flash #3 and Flash #4 may be provided by different dies or may be different logical units (with different logical unit numbers, i.e. the different LUNs). The four command queues CQ #1, CQ #2, CQ #3, and CQ #4 are provided for the four flash memory spaces Flash #1, Flash #2, Flash #3, and Flash #4, respectively. In an exemplary embodiment, the command queues CQ #1, CQ #2, CQ #3, and CQ #4 are allocated from a storage media, like a built-in SRAM or an external DRAM, to correspond to the flash memory spaces Flash #1, Flash #2, Flash #3, and Flash #4, respectively. In another exemplary embodiment, the command queues CQ #1, CQ #2, CQ #3, and CQ #4 are implemented by separate storage devices.

FIG. 1 also shows a control chip 100 of the data storage device in more detail. As shown, the flash memory spaces Flash #1, Flash #2, Flash #3 and Flash #4 are operated according to external commands from a host 102. The data storage device uses a DRAM (Dynamic Random Access Memory) as a data buffer to speed up the data access. The control chip 100 includes an input and output (I/O) interface 104, an input and output (I/O) controller 106, a central processing unit 108, a flash memory controller 110, and a DRAM controller 112. The flash memory controller 110 may allocate an SRAM built in the control chip 100 to provide the command queues CQ #1, CQ #2, CQ #3, and CQ #4. The central processing unit 108 and the flash memory controller 110 may be integrated in the same chip. In another exemplary embodiment, the central processing unit 108 and the flash memory controller 110 are separate chips.

Figure 2:
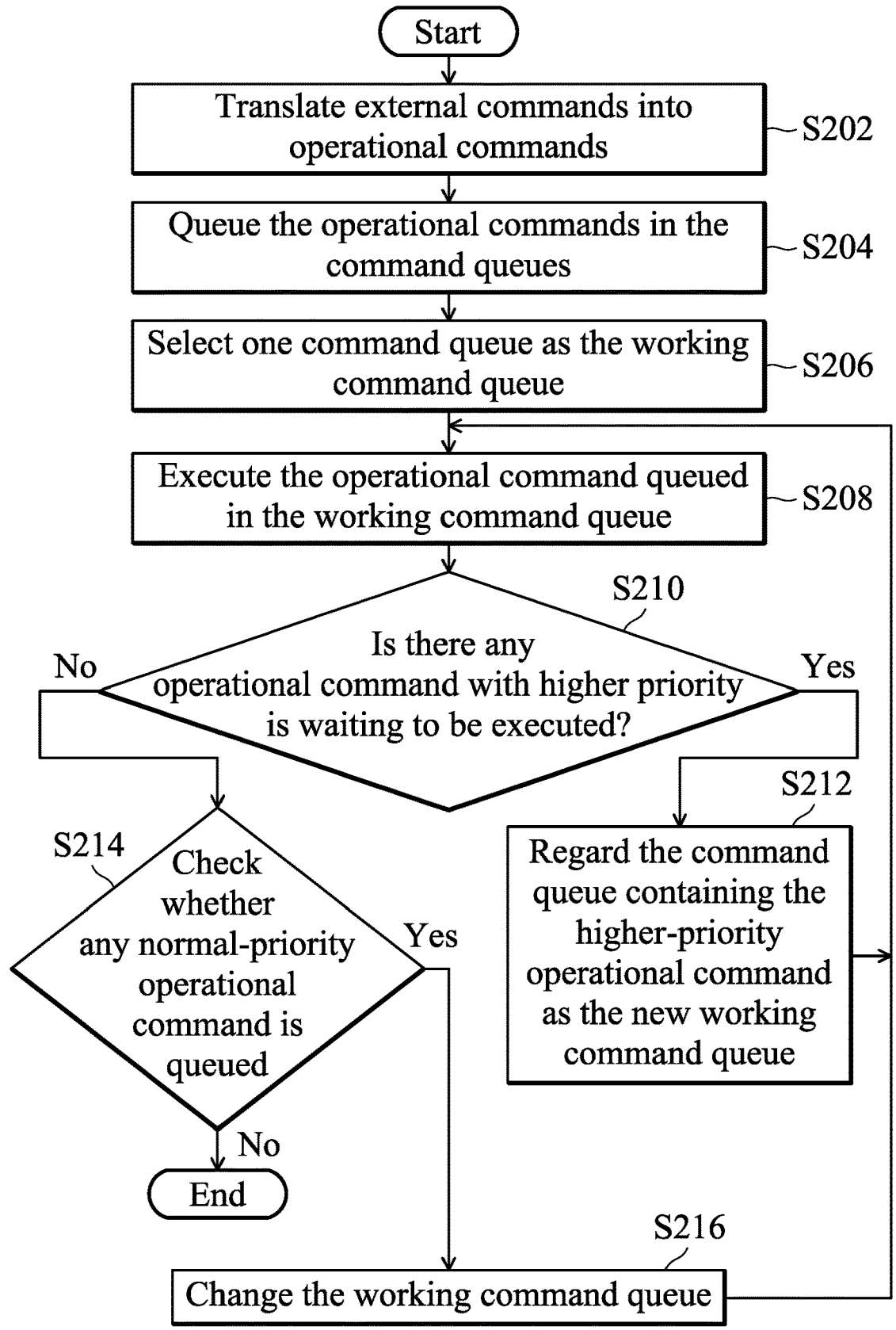
FIG. 2 is a flowchart for running operational commands in accordance with an exemplary embodiment of the disclosure.

FIG. 2 is a flowchart for running operational commands in accordance with an exemplary embodiment of the disclosure. In step S202, external commands are translated into operational commands. The external commands from the host 102 are transmitted to the central processing unit 108 through the I/O interface 104 and the I/O controller 106. The external commands may be compliant with communication protocols of NVMe (non-volatile memory express), ATA (advanced technology attachment), PATA (parallel ATA), SATA (serial ATA), SCSI (small computer system interface), MMC (multimedia card) or UFS (Universal Flash Storage).

In step S204, the operational commands are queued in the command queues. The central processing unit 108 sorts the external commands according to priority or the order of execution, and then sends the sorted external commands to the flash memory controller 110. The flash memory controller 110 translates the external commands into operational commands and pushes the operational commands to the corresponding command queues. For example, one external command may be translated into three operational commands and queued in corresponding ones among the command queues CQ #1, CQ #2, CQ #3, and CQ #4 waiting to be selected and executed by the flash memory controller 110 to operate the flash memory spaces Flash #1, Flash #2, Flash #3 and Flash #4 through one channel. The flash memory controller 110 further operates the DRAM controller 112 to control the DRAM to assist in the operations of the flash memory spaces Flash #1, Flash #2, Flash #3 and Flash #4.

The system performance of the data storage device depends on the way of switching among the different command queues to run the operational commands queued therein in a proper sequence. A task switching mechanism is disclosed in the disclosure to switch between the command queues. The task switching mechanism can make the command queues CQ #1, CQ #2, CQ #3, and CQ #4 take turns as the working command queue for execution of the operational commands queued therein. One implementation of the task switching mechanism uses task switching commands. According to a task switching command, the flash memory controller 110 changes the working command queue to be another command queue considering a selection condition. The operational commands queued in the new working command queue, therefore, takes the right to be executed. In another exemplary embodiment, a task switching mechanism is automatically triggered by a specifically-defined operational command. For example, after executing a status polling command or receiving a response of the status polling command, the flash memory controller 110 automatically selects another command queue considering a selection condition as the working command queue. The operational commands queued in the new working command queue, therefore, takes the right to be executed. In the following description, the task switching command is combined with the auto-start task switching for illustration, but not limited thereto.

In some exemplary embodiments, the task switching mechanism is combined with a Round Robin mechanism or any arbitration mechanisms. In an exemplary embodiment, the command queues CQ #1, CQ #2, CQ #3, and CQ #4 are checked one by one according to the numerical sequence to be selected as the new wording command queue. In another exemplary embodiment, all the command queues which have been processed are recorded for future selection to be the working command queue, and the recorded command queues may be selected based on the order in which they were recorded. In another exemplary embodiment, the task switching mechanism takes the priorities of operational commands into consideration. For example, a command queue containing an operational command having a higher priority than the normal priority operational commands should be selected as the new working command queue.

Figure 3:
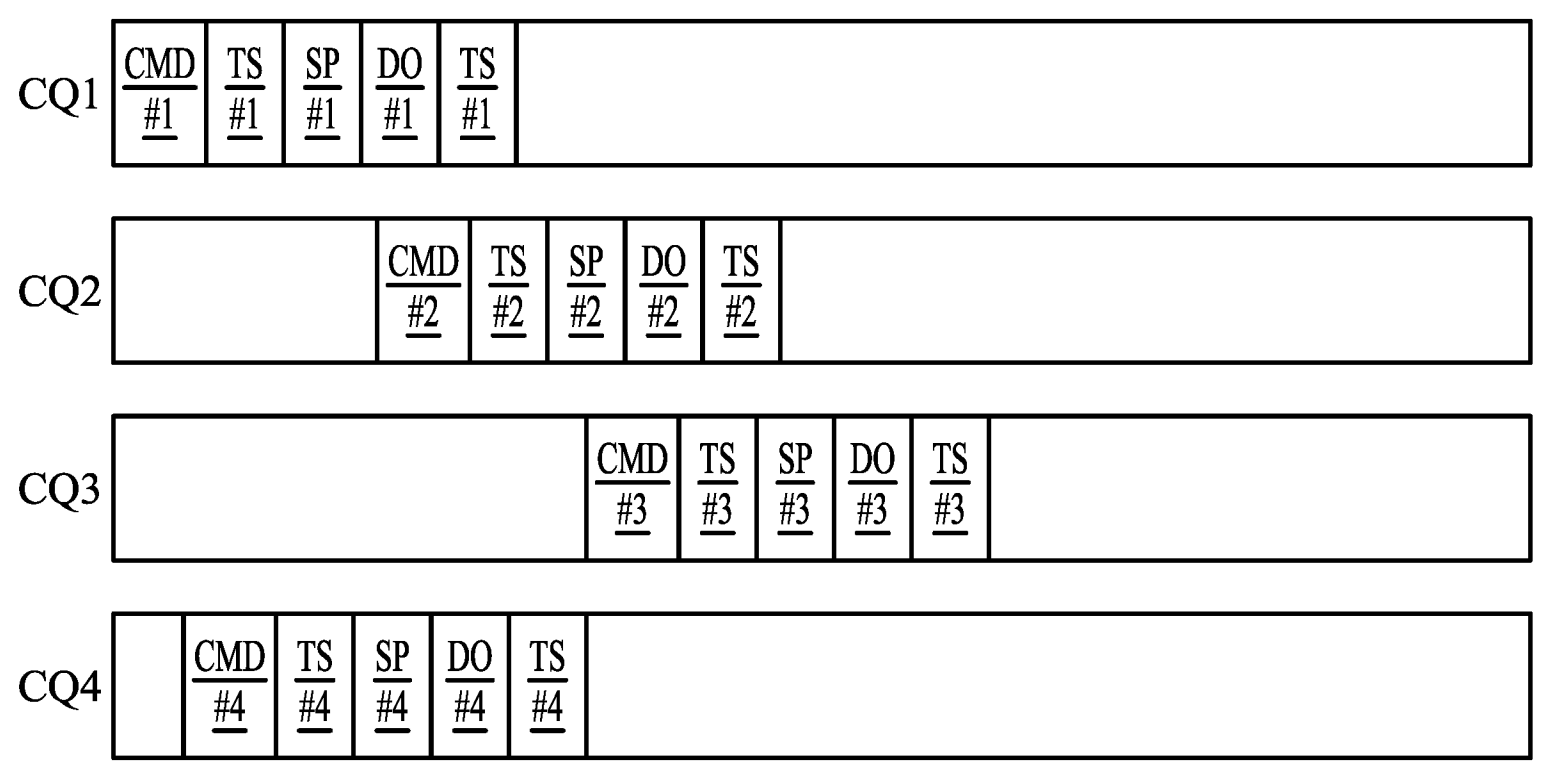

FIG. 3 is a timing diagram depicting four command queues CQ #1, CQ #2, CQ #3, and CQ #4 with operational commands queued therein. The operational commands are translated from external commands. As shown, the operational commands queued in the command queues CQ #1, CQ #2, CQ #3, and CQ #4 include task switching commands TS. In an exemplary embodiment, an external command for reading data from a flash memory space may be translated into five operational commands including one operational command CMD about a reading request, one task switching command TS following the operational command CMD, one status polling command SP, one data transmission command DO, and one task switching commands TS following the data transmission command DO.

Figure 4A:
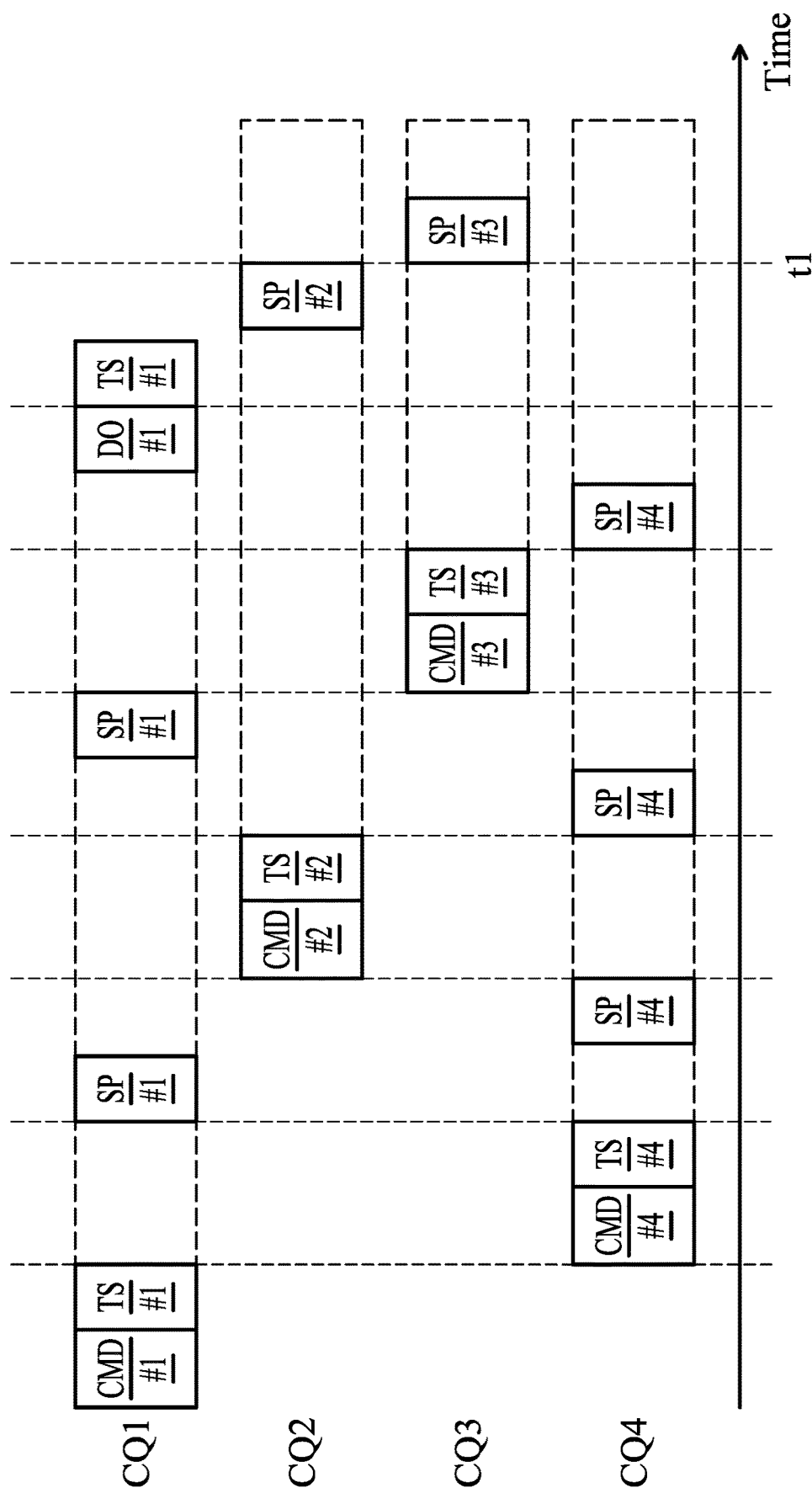
FIG. 4A and FIG. 4B depict a timing diagram of the execution of the operational commands queued in the four command queues CQ #1, CQ #2, CQ #3, and CQ #4 of FIG. 3.
Figure 4B:
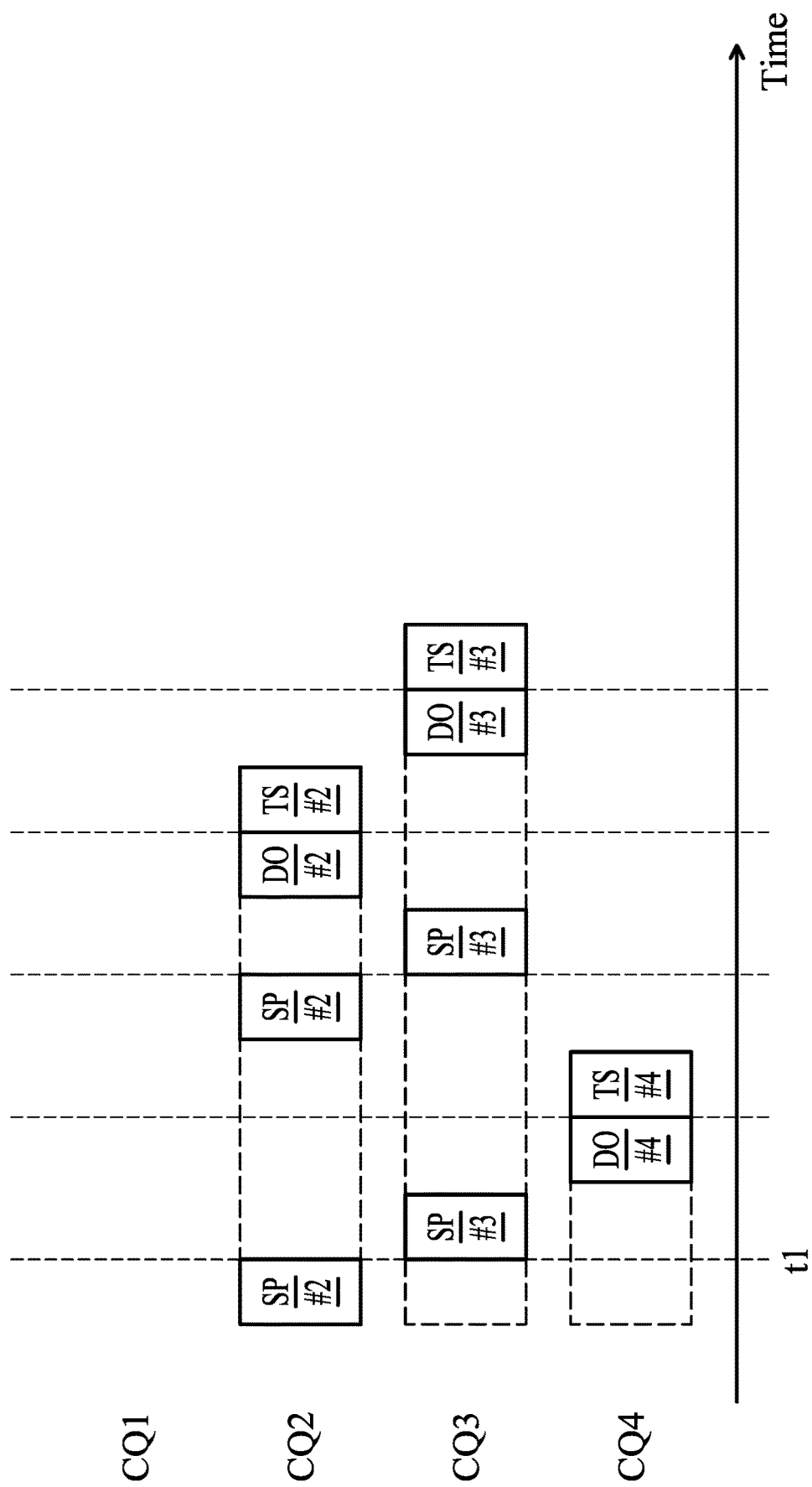

One command queue is selected in step S206 as the working command queue. FIGS. 4A and 4B depict a timing diagram of the execution of the operational commands queued in the four command queues CQ #1, CQ #2, CQ #3, and CQ #4 of FIG. 3. In order to simplify the explanation, each of the command queues CQ #1, CQ #2, CQ #3, and CQ #4 only has five operational commands queued therein. The operational commands CMD #1, CMD #2, CMD #3 and CMD #4 all are read commands (reading a page of data or reading data of a particular word line) which have high priority read commands. A read command for a page of data contains a plurality of sub commands to provide information such as an operation type, address, the end of operation, and so on, to control the flash memory spaces Flash #1, Flash #2, Flash #3 and Flash #4. The task switching commands TS #1, TS #2, TS #3 and TS #4 have normal priority and are used to detect whether there are operational commands queued in the command queues CQ #1, CQ #2, CQ #3, and CQ #4. After receiving a read command for a page of data, the corresponding flash memory space enters a busy state and it takes time for the target data to be prepared. Status polling commands SP #1, SP #2, SP #3, and SP #4 have normal priority and are used to check whether the corresponding flash memory space is busy. When a flash memory space is ready to output the target data, the flash memory is switched from the busy status to a ready status. A status polling command may be repeated executed till the corresponding flash memory space is read. In each round of status polling, a status polling command is issued and the status of the corresponding flash memory space is checked and a status response is returned. An auto-start task switching mechanism is activated after each round of status polling to detect whether the command queues CQ #1, CQ #2, CQ #3, and CQ #4 queue any operational command. Data transmission commands DO #1, DO #2, DO #3 and DO #4 have normal priority and are arranged after the ready status of the flash memory spaces Flash #1, Flash #2, Flash #3 and Flash #4 for transmission of the target data. As shown in FIG. 3, at the beginning, only the command queue CQ #1 queues an operational command. The command queue CQ #1, therefore, serves as the first working command queue.

In step S208, the operational command queued in the working command queue is executed. Referring to the timing diagram depicted in FIG. 4A and FIG. 4B, the operational command CMD #1 queued in the command queue CQ #1 is the first operational command to be executed. The flash memory space Flash #1 enters a busy status.

In step S210, it is determined whether any operational command with higher priority (in comparison with the normal priority operational commands TS, SP or DO) is waiting to be executed. If yes, step S212 is performed to regard the command queue containing the higher-priority operational command as the new working command queue. If no, step S214 is performed.

As shown, after the execution of the operational command CMD #1, the flash memory controller 110 executes a task switching command TS #1 to determine whether any operational command with higher priority is queued in the other command queues CQ #2, CQ #3, and CQ #4. It is observed that no operational command is queued in the command queues CQ #2 and CQ #3 and a high-priority operational command CMD #4 is queued in the command queue CQ #4. Therefore, the command queue CQ #4 is regarded as the new working command queue (S212). Step S208 is performed to run the operational command CMD #4 queued in the command queue CQ #4. The flash memory space Flash #4 enters the busy status.

Next, a task switching command TS #4 is executed and it is observed that a status polling command SP #1 is queued in the command queue CQ #1. Thus, the command queue CQ #1 is regarded as the new working command queue and the status polling command SP #1 in the command queue CQ #1 is executed to check whether the flash memory space Flash #1 has been switched to the ready status to correctly provide the target page of data (i.e. ready for a Data Out status). In this example, the first response to the status polling command SP #1 shows that the flash memory space Flash #1 is not ready.

Next, the flash memory controller 110 starts the auto-start task switching mechanism that is automatically triggered after the response to the status polling command SP #1. Step S210 is performed. Because no high-priority operational command is queued in the command queues CQ #1, CQ #2, CQ #3, and CQ #4, step S214 is performed to check whether any normal-priority operational command is queued in the command queues CQ #1, CQ #2, CQ #3, and CQ #4. If yes, step S216 is performed to change the working command queue. As shown, at that time, only the command queue CQ #4 contains an operational command—the status polling command SP #4. Thus, the command queue CQ #4 is regarded as the new working command queue (S216). Step S208 is performed to run the status polling command SP #4 in the command queue CQ #4. In this example, the first response to the status polling command SP #4 also shows that the flash memory space Flash #4 is not ready.

Next, the flash memory controller 110 starts the auto-start task switching mechanism that is automatically triggered after the response to the status polling command SP #4. Because a high-priority operational command CMD #2 in the command queue CQ #2 is obtained, the command queue CQ #2 is regarded as the new working command queue and the operational command CMD #2 is performed. The flash memory space Flash #2 enters the busy status.

Next, a task switching command TS #2 is executed. Because the command queue CQ #3 is empty, the command queue CQ #4 is regarded as the new working command queue and the status polling command SP #4 in the command queue CQ #4 is executed again. The second response to the status polling command SP #4 still shows that the flash memory space Flash #4 is not ready.

Next, the flash memory controller 110 starts the auto-start task switching mechanism that is automatically triggered by the response to the status polling command SP #4. The command queue CQ #1 is regarded as the new working command queue and the status polling command SP #1 in the command queue CQ #1 is executed again. The second response to the status polling command SP #1 shows that the flash memory space Flash #1 has been switched to the ready status.

Next, the flash memory controller 110 starts the auto-start task switching mechanism that is automatically triggered after the response to the status polling command SP #1. Because a high-priority operational command CMD #3 in the command queue CQ #3 is obtained, the command queue CQ #3 is regarded as the new working command queue and the operational command CMD #3 is performed. The flash memory space Flash #3 enters the busy status.

There is an advantage to automatically triggering a task switching mechanism every time a status polling command is performed. Data transmission will monopolize the bandwidth of the communication channel for a period of time. Considering the time may be wasted in waiting the complete of data transmission, prior to the data transmission, other operational commands are arranged to be executed. As described above, the high-priority operational command CMD #3 is performed before the execution of the data transmission command DO #1 to be prevented from being postponed by the data transmission activated by the data transmission command DO #1. In other cases of less data transmission and less occupation time of the communication channel, the present invention also reserves the flexibility to transmit data directly without the task switching arranged after the "ready" response to a status polling command. The task switching may be arranged after the data transmission is over, to efficiently transmit data without being postponed by task switching.

After the operational command Cmd #3, a task switching command TS #3 is executed and the status polling command SP #4 still queued in the command queue CQ #4 is obtained. The command queue CQ #4 is regarded as to the new working command queue and the status polling command SP #4 is executed again. This time, the response to the status polling command SP #4 shows that the flash memory space Flash #4 has been switched to the ready status.

Next, the flash memory controller 110 starts the auto-start task switching mechanism which is automatically triggered after the response to the status polling command SP #4. A data transmission command DO #1 queued in the command queue CQ #1 is obtained. The command queue CQ #1 is regarded as the new working command queue and the data transmission command DO #1 is performed.

After the data transmission command DO #1 is finished, the final operational command, another task switching command TS #1, queued in the command queue CQ #1 is executed. At that time there is a status polling command SP #2 queued in the command queue CQ #2. The command queue CQ #2 is regarded as the new working command queue and the status polling command SP #2 is executed. Next, it is observed that there is a status polling command SP #3 queued in the command queue CQ #3. The command queue CQ #3 is regarded as the new working command queue and the status polling command SP #3 is executed. Next, it is observed that there is a data transmission command DO #4 queued in the command queue CQ #4. The command queue CQ #4 is regarded as the new working command queue and the data transmission command DO #4 is executed. Next, the final operational command, another task switching command TS #4, queued in the command queue CQ #4 is executed.

According to the execution of the task switching command TS #4, the status polling command SP #2 queued in the command queue CQ #2 is obtained. The command queue CQ #2 is regarded as the new working command queue and the status polling command SP #2 is executed again. This time, the response to the status polling command SP #2 shows that the flash memory space Flash #2 has been switched to the ready status.

Next, the flash memory controller 110 starts the auto-start task switching mechanism which is automatically triggered after the response to the status polling command SP #2. The status polling command SP #3 queued in the command queue CQ #3 is obtained. The command queue CQ #3 is regarded as the new working command queue and the status polling command SP #3 is executed again. This time, the response to the status polling command SP #3 shows that the flash memory space Flash #3 has been switched to the ready status.

Next, the flash memory controller 110 starts the auto-start task switching mechanism which is automatically triggered after the response to the status polling command SP #3. The data transmission command DO #2 queued in the command queue CQ #2 is obtained. The command queue CQ #2 is regarded as the new working command queue and the data transmission command DO #2 is executed.

After the data transmission command DO #2 is finished, the final operational command, another task switching command TS #2, queued in the command queue CQ #2 is executed. It is observed that there is a data transmission command DO #3 queued in the command queue CQ #3. The command queue CQ #3 is regarded as the new working command queue and the data transmission command DO #3 is executed. Next, the final operational command, another task switching command TS #3, queued in the command queue CQ #3 is executed. Because no operational command is queued in any command queues, the flow of the execution of operational commands ends.

Figure 5A:
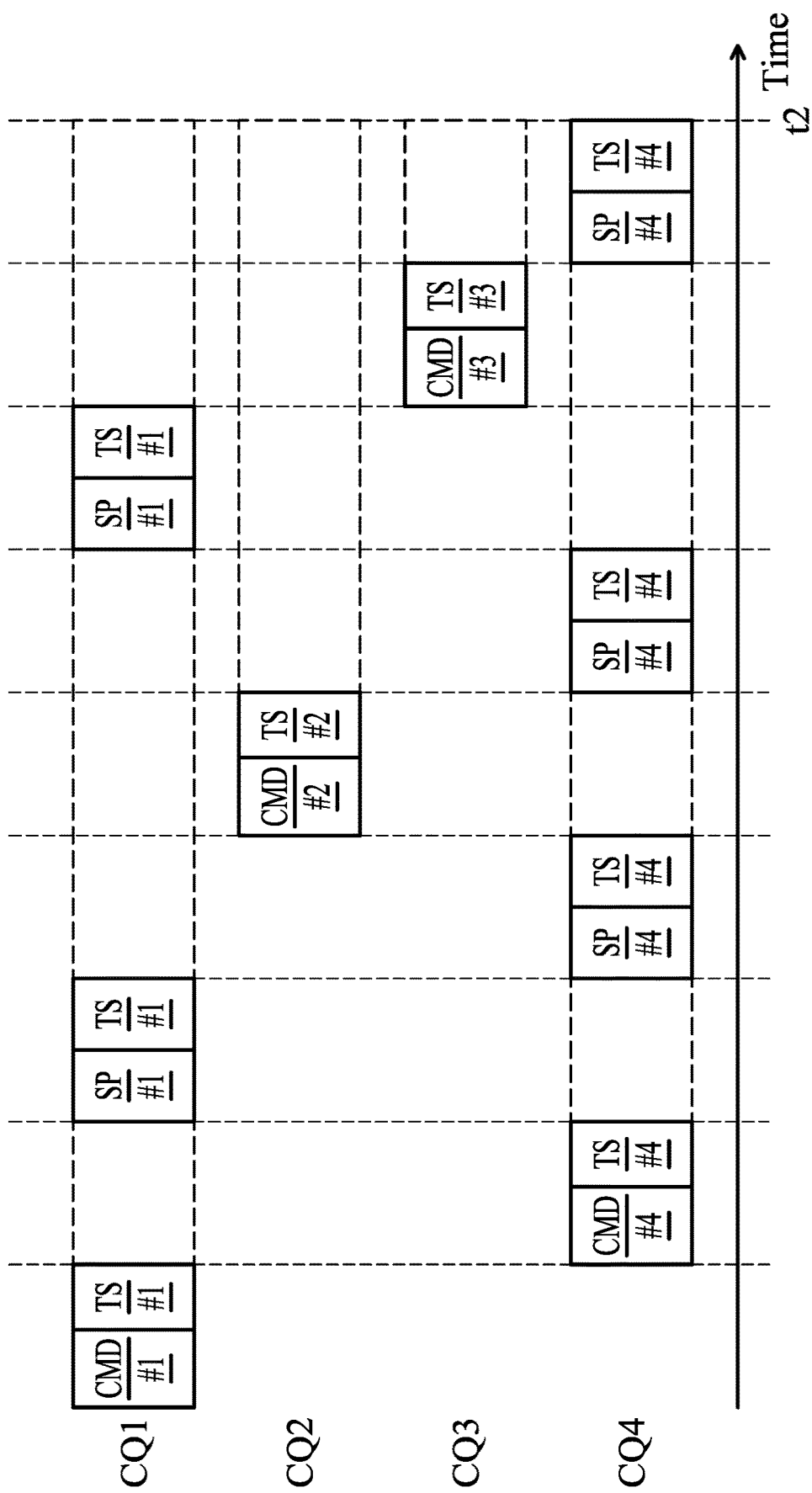
FIG. 5A and FIG. 5B depict another timing diagram for the execution of the operational commands queued in the command queues of FIG. 3.
Figure 5B:
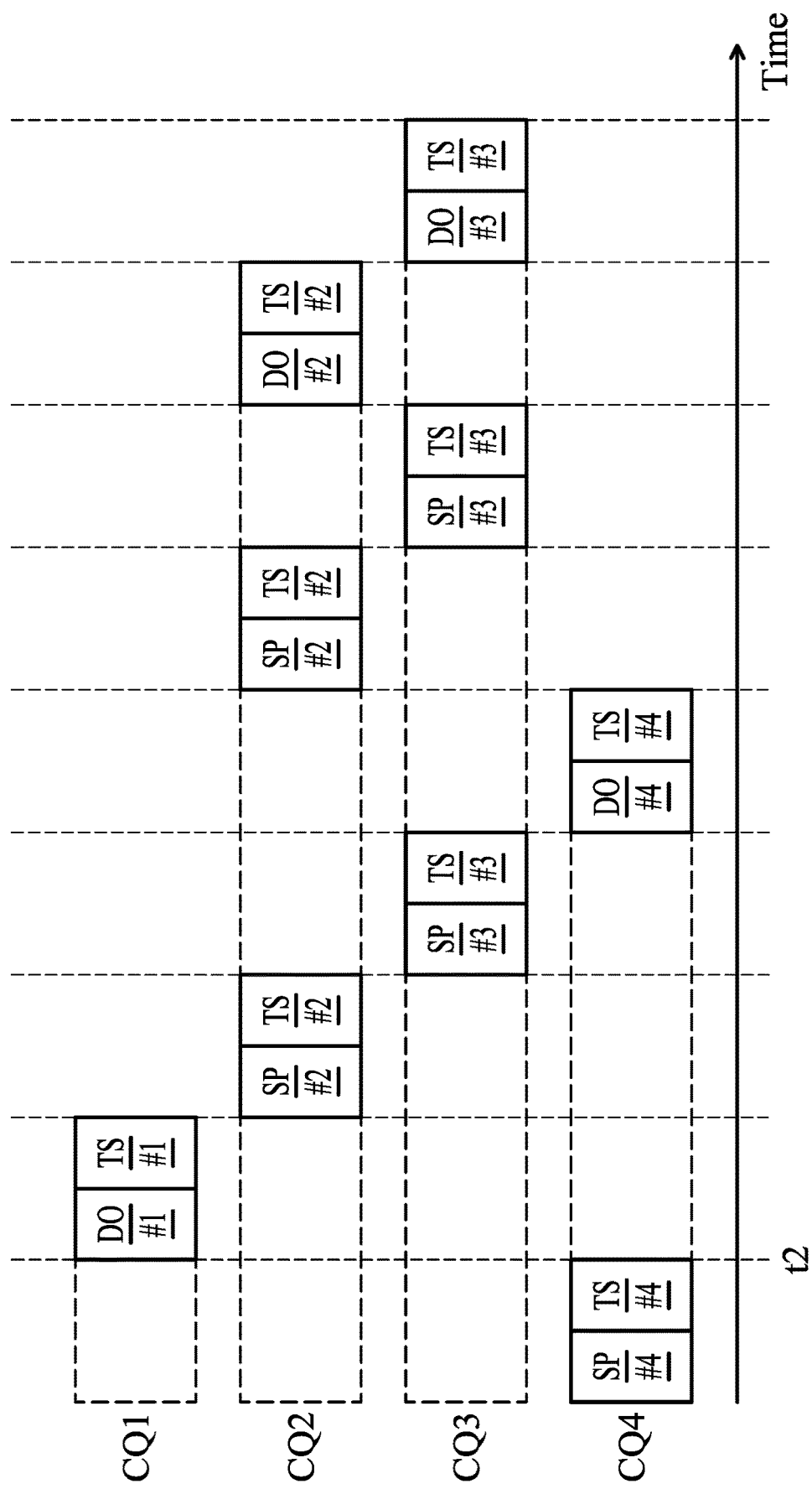

FIG. 5A and FIG. 5B depict another timing diagram for the execution of the operational commands queued in the command queues as FIG. 3, which is similar to the timing diagram depicted in FIGS. 4A and 4B. The main difference is that the flash memory controller 110 does not automatically start the task switching without task switching commands. Step S210 or step S214 is not automatically performed by the flash memory controller 110. Task switching commands, such as TS #1, TS #2, TS #3 and TS #4, are required to perform step S210 or step S214.

The task switching commands TS #1, TS #2, TS #3 and TS #4 may have the same functions. The data transmission commands DO #1, DO #2, DO #3, and DO #4 may have the same functions. The number is used to associate the task switching commands and the data transmission commands (or even the external commands or the operational commands CMD) with the corresponding flash memory space.

In conclusion, by the separated command queues CQ #1, CQ #2, CQ #3, the flash memory spaces Flash #1, Flash #2, Flash #3 and Flash #4 are alternately operated in an efficient way to share the same channel. The operational commands CMD #1, CMD #2, CMD #3 and CMD #4 requested through the same channel can be timely performed and rarely affected by the status polling or data transmission of any flash memory space. The operational commands CMD #1, CMD #2, CMD #3 and CMD #4 can be executed as timely as possible to operate the corresponding flash memory spaces Flash #1, Flash #2, Flash #3 and Flash #4 to start the preparation for transmitting data. For the logical units of the flash memory spaces sharing the same channel, the disclosure results in overlapped data preparation time and efficiently-arranged data transmission time. In addition, although a flash memory read command is used herein as an example, the present invention is not limited to read commands. A high degree of flexibility is provided. Other operational commands, such as write commands, erase commands, and the like, may be regarded as having a high priority by the firmware that operates the flash memory spaces. Task switching commands are used by the firmware to easily switch between the command queues of the different flash memory spaces.

In order to efficiently execute the operational commands queued in the command queues CQ #1, CQ #2, CQ #3, and CQ #4, pointers p #1, p #2, p #3, and p #4 are provided for the different command queues CQ #1, CQ #2, CQ #3, and CQ #4 to indicate the operational command that is being executed or is going to be executed. Thus, the flash memory controller 110 fluently switches among the command queues CQ #1, CQ #2, CQ #3, and CQ #4 to execute operational commands.

Figure 6:
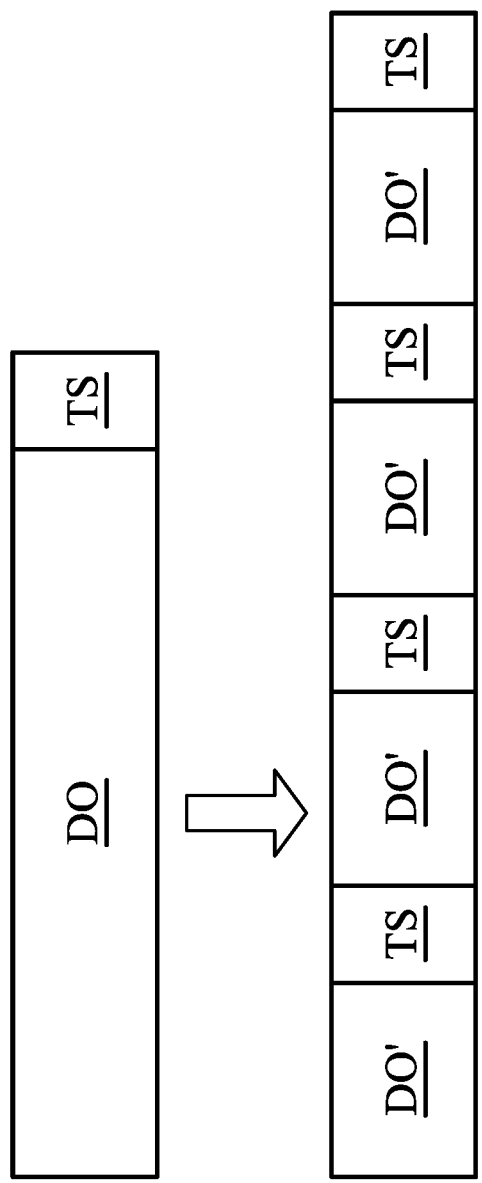
FIG. 6 depicts how to the task switching commands are inserted into the data transmission.

In some exemplary embodiments, the task switching mechanism is further arranged in data transmission. FIG. 6 depicts how to the task switching commands are inserted into the data transmission. For one flash memory space, the default amount of data transmission is one page (e.g. 16 KB). The default amount of data transmission may be divided into equal parts, e.g. 4 equal parts with each part containing 4 KB of data. As shown, the data transmission command DO is divided into four data transmission commands DO'. Each data transmission command DO' is provided to transmit 4 KB of data. Each data transmission command DO' is followed by one task switching command TS. In this manner, even if a large amount of data transmission is required, the operational commands of other flash memory spaces are not postponed and have the opportunity to be executed as soon as possible to prepare the transmission data.

In some exemplary embodiments, a state machine is provided within the flash memory controller 110 to attach task switching commands to page data read commands or data transmission commands. The state machine may be further designed to check, at the end of one round of status polling, the other command queues to give priority to the page data read commands queued in the other command queues. When no page data read commands are obtained, the state machine gives priority to status polling commands or data transmission commands queued in the other command queues. The state machine is responsible for switching among the command queues CQ #1, CQ #2, CQ #3, and CQ #4 to execute the operational commands queued therein.

Other techniques that use the aforementioned concepts to operate a non-volatile memory are within the scope of the disclosure. Based on the above contents, the present invention further relates to methods for operating a non-volatile memory.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A data storage device, comprising:
a plurality of non-volatile memory spaces;
a plurality of command queues, provided to correspond to the plurality of non-volatile memory spaces one on one; and
a controller, dividing a data transmission command to insert task switching commands between divided data transmission commands,
wherein the non-volatile memory spaces are operated through the same channel.

2. The data storage device as claimed in claim 1, wherein:
the controller further determines whether to change a working command queue or not at the end of each round of status polling.

3. The data storage device as claimed in claim 2, wherein:
at the end of one round of status polling, the controller checks whether any command queue besides the working command queue contains a high-priority command having higher priority than normal-priority commands, to change the working command queue, for execution of the high-priority command.

4. The data storage device as claimed in claim 1, wherein:
the controller further attaches a task switching command to the end of each high-priority command for each non-volatile memory space, and each high-priority command has higher priority than normal-priority commands.

5. The data storage device as claimed in claim 4, wherein:
when executing the task switching command, the controller checks whether any command queue besides the working command queue contains a high-priority command, to change the working command queue, for execution of the high-priority command.

6. The data storage device as claimed in claim 5, wherein:
when no high-priority command is obtained in the execution of the task switching command, the controller checks whether any command queue besides the working command queue contains a status polling command, to change the working command queue, for execution of the status polling command.

7. The data storage device as claimed in claim 5, wherein:
when no high-priority command is obtained in the execution of the task switching command, the controller checks whether any command queue besides the working command queue contains a data transmission command, to change the working command queue, for execution of the data transmission command.

8. A non-volatile memory operating method, comprising:
operating a plurality of non-volatile memory spaces through the same channel;
providing a plurality of command queues corresponding to the plurality of non-volatile memory spaces one on one; and
dividing a data transmission command to insert task switching commands between divided data transmission commands.

9. The non-volatile memory operating method as claimed in claim 8, further comprising:
determining whether to change a working command queue or not at the end of each round of status polling.

10. The non-volatile memory operating method as claimed in claim 9, further comprising:
at the end of one round of status polling, checking whether any command queue besides the working command queue contains a high-priority command having higher priority than normal-priority commands, to change the working command queue, for execution of the high-priority command.

11. The non-volatile memory operating method as claimed in claim 8, further comprising:

attaching a task switching command to the end of each high-priority command for each non-volatile memory space, each high-priority command having higher priority than normal-priority commands.

12. The non-volatile memory operating method as claimed in claim 11, further comprising:

when executing the task switching command, checking whether any command queue besides the working command queue contains a high-priority command, to change the working command queue, for execution of the high-priority command.

13. The non-volatile memory operating method as claimed in claim 12, further comprising:

when no high-priority command is obtained in the execution of the task switching command, checking whether any command queue besides the working command queue contains a status polling command, to change the working command queue, for execution of the status polling command.

14. The non-volatile memory operating method as claimed in claim 12, further comprising:

when no high-priority command is obtained in the execution of the task switching command, checking whether any command queue besides the working command queue contains a data transmission command, to change the working command queue, for execution of the data transmission command.

15. A method for executing operational commands to operate a data storage medium, comprising:

translating a plurality of external commands into a plurality of operational commands;

using a plurality of command queues to queue the operational commands;

selecting one of the command queues as the working command queue;

executing one operational command queued in the working command queue;

dividing a data transmission command to insert task switching commands between divided data transmission commands; and changing the working command queue to be another command queue when one task switching command of the task switch commands is executed and a selection condition is satisfied.

16. The method as claimed in claim 15, wherein the selection condition is satisfied when one particular type of operational command among the operational commands is detected queued in one of the command queues.

17. The method as claimed in claim 15, wherein:

the selection condition is satisfied when one particular type of operational command among the operational commands is detected queued in one of the command queues; and the particular type of operational command has higher priority than normal-priority commands.

18. The method as claimed in claim 15, wherein the data storage medium is non-volatile.

19. The method as claimed in claim 15, further comprising:

recording a command queue number for identifying the working command queue.

20. The method as claimed in claim 15, wherein:

the external commands come from outside of a data storage device, and the data storage medium is arranged within the data storage device.

21. The method as claimed in claim 15, wherein:

the command queues correspond to different storage spaces of the data storage medium one-to-one.

22. A method for executing operational commands to operate a data storage medium, comprising:

using a plurality of command queues to queue operational commands;

selecting one of the command queues as the working command queue;

executing one operational command queued in the working command queue;

dividing a data transmission command to insert task switching commands between divided data transmission commands; and changing the working command queue to be another command queue when one task switching command of the task switch commands is executed and a selection condition is satisfied.

* * * * *